United States Patent [19]

Priddy

[11] Patent Number: 4,489,616
[45] Date of Patent: Dec. 25, 1984

[54] DIGITAL FLUID FLOW METER

[76] Inventor: Jerry L. Priddy, 216 S. 162 E., Tulsa, Okla. 74108

[21] Appl. No.: 494,899

[22] Filed: May 16, 1983

[51] Int. Cl.³ .............................................. G01F 1/06
[52] U.S. Cl. ................................................ 73/861.79
[58] Field of Search ................. 73/861.79, 861.87, 253

[56] References Cited

U.S. PATENT DOCUMENTS 3,981,194 9/1976 Blise et al. ............................. 73/253
4,173,144 11/1979 Pounder ........................... 73/861.79
4,179,924 12/1979 Tomczak ......................... 73/861.79

*Primary Examiner*—Herbert Goldstein
*Attorney, Agent, or Firm*—Head, Johnson & Stevenson

[57] ABSTRACT

A fluid flow meter comprising a shallow rectangular block with first and second faces parallel to each other, a circular opening of selected radius through the block, perpendicular to the faces, an impeller with multiple radial vanes inserted into the central opening, an entrance conduit longitudinally drilled through the block approximately midway between the first and second faces which intersects the circular opening approximately tangentially, a portion of the first face adjacent the circular opening depressed a selected small depth forming a first channel for outflow of fluid. Second conduit means connected to the first channel, and means to cover the first and second faces of the block to seal all openings.

7 Claims, 6 Drawing Figures

DIGITAL FLUID FLOW METER

BACKGROUND OF THE INVENTION

1. Field of the Invention

This invention lies in the field of apparatus for measuring the flow rate and total flow of a selected fluid.

2. Description of the Prior Art

There are many examples of fluid flow meters from the conventional home gas meter, that measures the flow of natural gas to the home, or the water meter that measures the total flow of water delivered to a home. There are many different types and sizes of flow meters for specialized purposes, in connection with other devices such as chemical mixers and the like. One important application of this flow meter would be with apparatus for monitoring the total flow of fluid through a purifier or other similar device, where a chemical action takes place and the chemical is consumed in the operation. It becomes important to know when the chemical is consumed and needs replacement and a simple small convenient and inexpensive flow meter such as that of this invention would be extremely useful.

SUMMARY OF THE INVENTION

It is a primary object of this invention to provide a simple, small, convenient and inexpensive type of flow meter for many commercial uses.

These and other objects are realized and the limitations of the prior art are overcome in this invention by utilizing a slab of suitable material which can be metal or plastic, and can be machined, cast or molded, for example. It comprises a body which conveniently can be a rectangular slab or a selected thickness T. A circular opening of selected radius R is drilled through the body from the first face to the second face, and an impeller is positioned inside that cylindrical cavity, with sufficient clearance that it can turn freely within the circumferential wall.

A plurality of radial vanes are formed on the outer portions of the impeller equally spaced and similarly shaped. A cylindrical boss of selected diameter and length is formed on one face of the impeller, and a corresponding boss of equal or lesser axial dimension on the other face of the impeller. The total dimension of the impeller plus the two bosses are substantially equal to the thickness T of the block. Two thin plates of suitable material are attached and sealed to the two faces of the body. With those in place, the rotor is enclosed and is free to turn when fluid flows through the device.

An inlet tube or passage is drilled longitudinally into the block approximately midway between the two faces so as to intersect the cylindrical cavity approximately tangentially.

A portion of the top face of the block adjacent the circular cavity and in a selected relation to the point of tangency of the inlet conduit, is depressed a selected depth D forming a shallow channel through which the fluid that enters through the inlet conduit can flow longitudinally through the slots of the impeller, to the channel and from the channel to an outlet conduit.

The rotation of the impeller or rotor is sensed by placing a small diameter short permanent magnet within one of the vanes of the impeller and positioning a suitable coil close to the rotating impeller so that as a magnet moves across the coil, an electrical voltage will be generated which can be amplified. This can be sent to a binary counter which will count the pulses, one for each rotation of the impeller. The total count will, of course, be equal to the total number of revolutions, and will be a function of the total flow through the meter. This total flow can be converted from binary to decimal notation and can be displayed as a decimal number, or can be recorded. The electrical circuitry is quite simple. It can also have a clock which will count to a selected period of time and will determine the total number of revolutions within the period of that time. Such a number will be the flow rate of fluid through the device.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
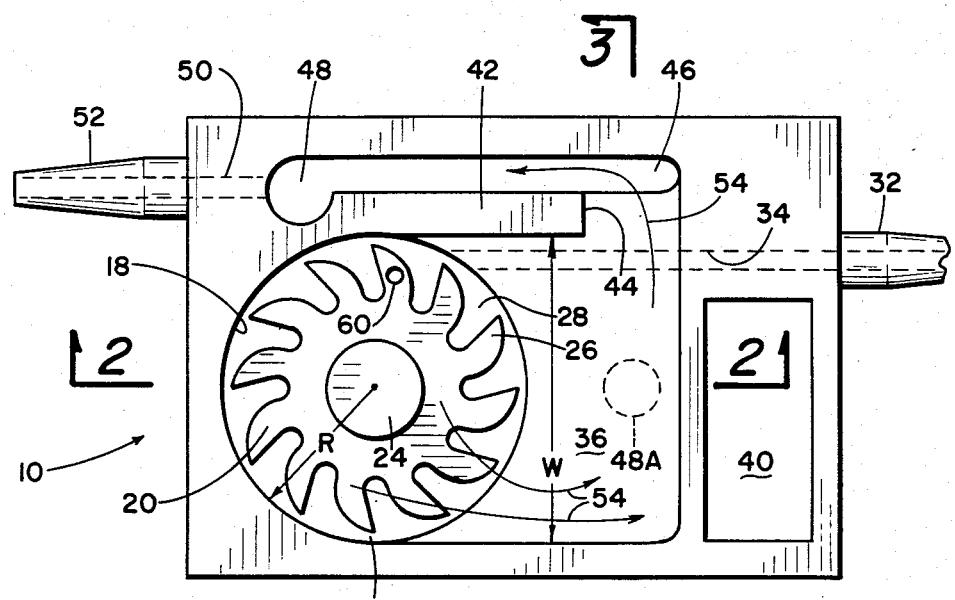
FIG. 1 represents schematically a plan view of the flow meter of this invention with the top plate removed.
Figure 2:
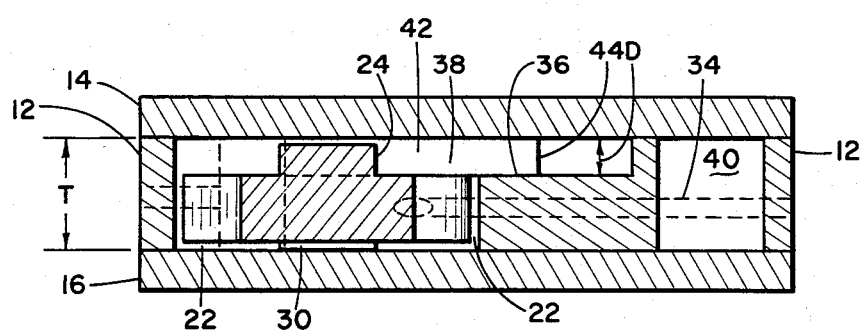
FIG. 2 is a cross-section taken along the plane 2—2 of FIG. 1.
Figure 3:
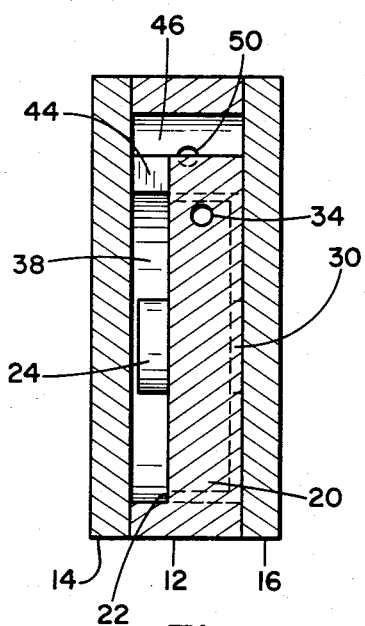
FIG. 3 is a cross-section taken along the plane 3—3 of FIG. 1.

Referring now to the drawings and in particular to FIGS. 1, 2 and 3, there are shown in three views one embodiment of this invention.

The flow meter of this invention is indicated generally by the numeral 10. It comprises for example, a rectangular body, slab or plate 12 of thickness T with parallel faces. A circular opening 18 is machined through the block, with axis perpendicular to the faces, having a radius R. A cylindrical impeller 20 having an outer diameter slightly less than 2R, is adapted to be positioned inside this cylindrical cavity. It has a first axial boss 24 of length D on one side and a second axial boss 30 on the other side. The second boss can be as thick as the first boss or axial thinner. It serves to maintain a selected dimension of clearance 22 between the bottom surface of the impeller and the bottom cover plate 16.

The impeller has a plurality of spaced similar radial vanes 26 with corresponding spaces 28 between the vanes. These can be straightsided as will be shown in FIG. 5, or curved, as shown in FIG. 1. An inlet conduit 34 is drilled through the block and intersects the circular cavity approximately tangentially, as shown in FIG. 1. Means 32 and 52 are provided for the attachment of suitable conduits into and out of the flow meter.

A portion of the top face of the body 12 adjacent half of the circular cavity is depressed a selected depth D and has a width W, which is slightly less than the diameter of the cylindrical cavity. This volume 38 between the depressed surface 36 and the cover plate 14 on the top, forms a channel for the outflow of fluid from the spaces between the vanes as the impeller, having one face substantially coplanar with the channel 36, rotates and leads to a channel 46 and to an outlet conduit 50 with corresponding fixture 52.

To sum what has been said, there is a central body 12 which is a slab of uniform thickness T with plane parallel faces and has a cylindrical cavity cut from the top or the first face to the bottom face, part of the face 36 is cut away to form a channel for outlet flow of fluid from the impeller in accordance with arrows 54, through the channel 38 and to conduit 46 to the outlet conduit 50. Inflow of fluid is through the entrance conduit 34 which intersects the cylindrical cavity approximately tangentially. Two cover plates 14 and 16 are provided to be positioned over and sealed to two faces of the body, which completely enclose the impeller.

Figure 6:
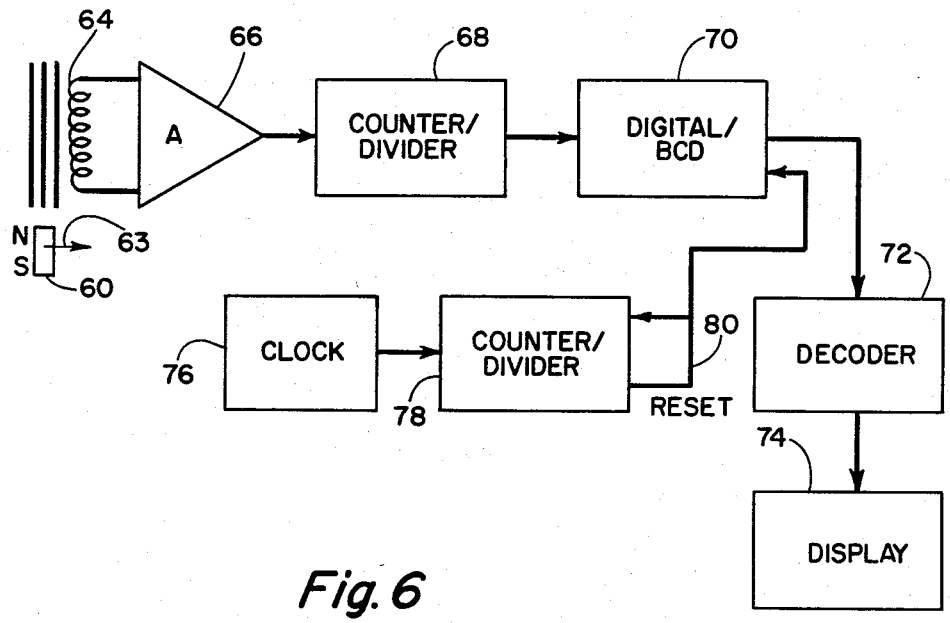
FIG. 6 illustrates schematically the electronic circuitry for displaying the total flow through the flow meter and the flow rate of fluid through the flow meter.

In FIG. 1 a volume 40 is cut out of the body from top to bottom for the purpose of positioning therein batteries and electronics for counting the revolutions of the impeller. A small diameter magnet 60 is inserted into a drilled hole into one of the vanes, and as shown in FIG. 6 a suitable coil 64 (not shown in FIG. 1) is mounted in the space 38, for example, or on the outside of the top cover, with suitable electronic means to count the pulses generated each time the rotor impeller makes one complete revolution. This signal is generated in the coil 64 and amplified by a preamplifier 66. The voltage is generated when the magnet 60 moves laterally in direction 62 with respect to the coil 64. The output of the amplifier goes to a digital counter 68 which continuously updates a binary number representing the total counts of rotation of the impeller. This binary number formed in 70 goes to a binary coded decimal coder and to a decoder 72, and to a decimal display 74. Thus, a decimal number is continually displayed in the display 74 which represents total rotations of the impeller.

By use of a conventional digital clock 76, well known in the art, and a counter divider 78, which can be set or programmed, the block will count to a selected number of time units, and will then reset itself and reset the digital-to-binary coded decimal in box 70. This will reset the display to zero which will then count up from zero each time it is reset by the clock. The number that the display shows just before it is reset is then a number corresponding to the flow rate. That is, the total number of rotations of the impeller in a selected number of time units.

Figure 5:
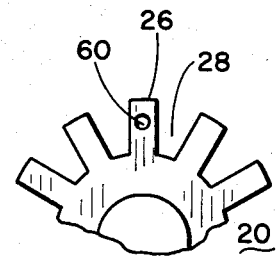
FIG. 5 illustrates an alternative construction of the impeller vanes.

I have found that the operation and the precision of operation of this fluid flow meter does not greatly depend upon the shape of the impeller which can vary from a rounded contour as shown in FIG. 1 to a straight sided contour as shown in FIG. 5; where the vanes 26 are substantially parallel sided, and the space between 28 is substantially tapering. The magnet 60 would be positioned in one of the vanes such as 26.

Figure 4:
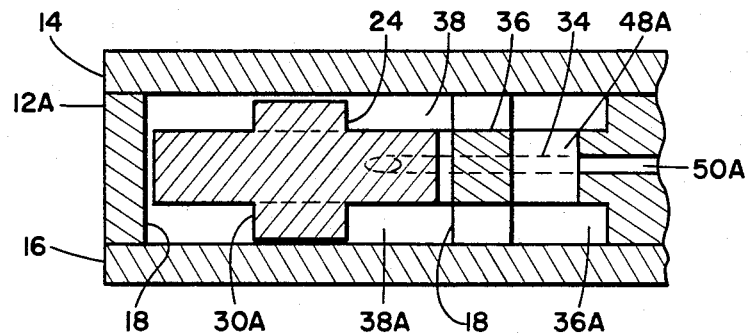
FIG. 4 illustrates a variation of the design of FIG. 2.

Referring now to FIG. 4, there is shown a second embodiment, which is a variation of FIG. 2. What has been done here, has been to make a second depressed surface 36A a distance D below the bottom surface of the block, as a mirror image of the depressed surface 36 on the first side of the block. The rotor would be similar except that the two bosses 24 and 30A would be of equal dimension. The inlet conduit 34 would be positioned substantially in the midpoint between the two surfaces of the impeller so the flow of fluid would be symmetrically up and below the impeller through the two channels 38 and 38A, to a transverse opening through the body 48A and to an outlet conduit 50A.

Since there is clearance on all surfaces of the impeller, with respect to the cover plates 14 and 16 and the wall of the circular cavity, the flow of fluid will be around, over and under the impeller, which will "float" in the surrounding fluid. No axis is required to hold the impeller in position. The floating action does that.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein, but is to be limited only by the scope of the attached claim or claims, including the full range of equivalency to which each element thereof is entitled.

What is claimed is:

1. A fluid flow meter, comprising;
   (a) a shallow block with first and second faces parallel to each other and separated by a thickness T, with a circular opening of selected radius R through said block; with axis perpendicular to said faces;
   (b) a first entrance conduit longitudinally through said block approximately midway between said first and second faces, intersecting said circular opening approximately tangentially;
   (c) a portion of said first face adjacent said circular opening depressed a depth D, forming a first channel of approximate width W, where W is slightly less than 2R, and depth D;
   (d) second exit conduit means connected to said first channel;
   (e) circular impeller means of radius slightly less than R in said circular opening, said impeller having a plurality of spaced substantially radial vanes, and having a first axial boss of length D extending from a first face, and a second axial boss extending from the second face of said impeller, the total thickness of impeller plus first and second bosses equal approximately to T, with said first face of said impeller approximately coplanar with said first channel; and
   (f) means on said first and second faces to at least cover and seal all openings on said first and second surfaces.

2. The flow meter as in claim 1 and including means to sense the rotation of said impeller.

3. The flow meter as in claim 2 and including means to count the revolutions of said impeller.

4. The flow meter as in claim 1 and including a second channel in said second surface of said block, approximately the size and position of said first channel; said second exit conduit intersecting both said first and second channels.

5. The flow meter as in claim 2 in which said sensor means is electromagnetic.

6. The flow meter as in claim 1 in which the sides of said vanes of said impeller are straight.

7. The flow meter as in claim 1 in which the sides of said vanes of said impeller are curved.

* * * * *